United States Patent [19]
Layton

[11] 3,921,461
[45] Nov. 25, 1975

[54] DIFFERENTIAL HYDROMETER ASSEMBLY

[76] Inventor: Howard M. Layton, P.O. Box 450, Salem Road, Pound Ridge, N.Y. 10576

[22] Filed: May 15, 1974

[21] Appl. No.: 470,322

[52] U.S. Cl............................................. 73/447;
[51] Int. Cl.² ........................................... G01N 9/10
[58] Field of Search .............. 73/447, 449, 453, 451

[56] References Cited
UNITED STATES PATENTS

| | | | |
|---|---|---|---|
| 2,273,850 | 2/1942 | Ewald | 73/453 |
| 3,186,423 | 6/1965 | Davidson et al. | 73/447 |
| 3,392,589 | 7/1968 | Kuntz et al. | 73/449 |
| 3,473,381 | 10/1969 | Allen | 73/314 |

FOREIGN PATENTS OR APPLICATIONS

| 301,946 | 10/1932 | Italy | 73/447 |
|---|---|---|---|

Primary Examiner—James J. Gill
Assistant Examiner—Anthony V. Ciarlante

[57] ABSTRACT

A differential hydrometer assembly adapted to generate an electrical signal whose value is a function of the specific gravity of a liquid in a bath whose level is subject to change. The assembly includes a hydrometer having a weighted float fully immersible in the bath and provided with an upwardly-extending stem passing through an opening in a more buoyant reference float partly immersible in the bath whereby the relative vertical positions of the floats depend on specific gravity. Associated with the hydrometer is a displacement transducer having one component disposed on the stem and a cooperating component disposed on the reference float to produce an output signal that is a function of the displacement of the stem relative to the reference float.

5 Claims, 12 Drawing Figures

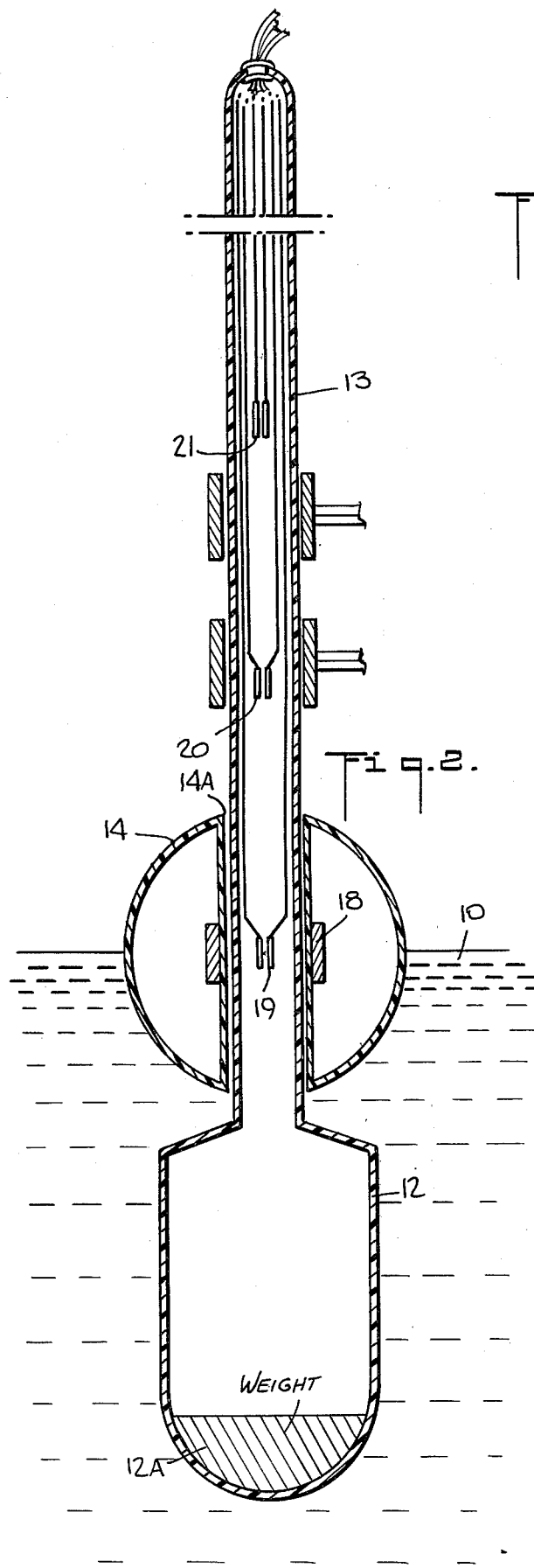
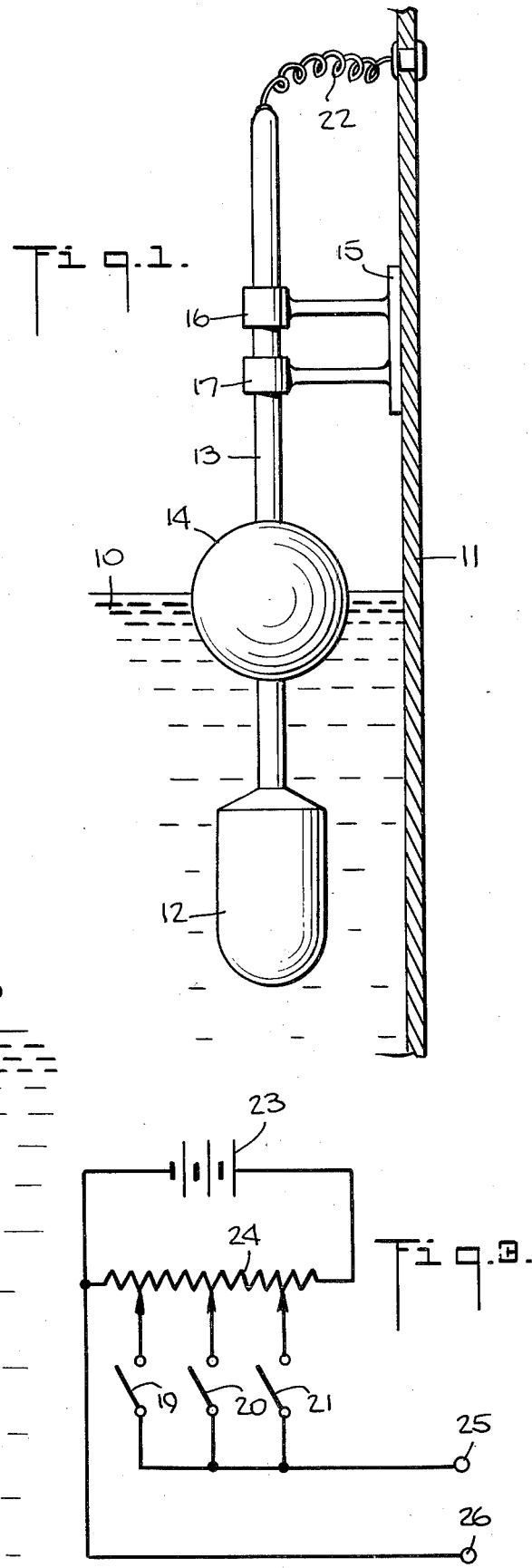

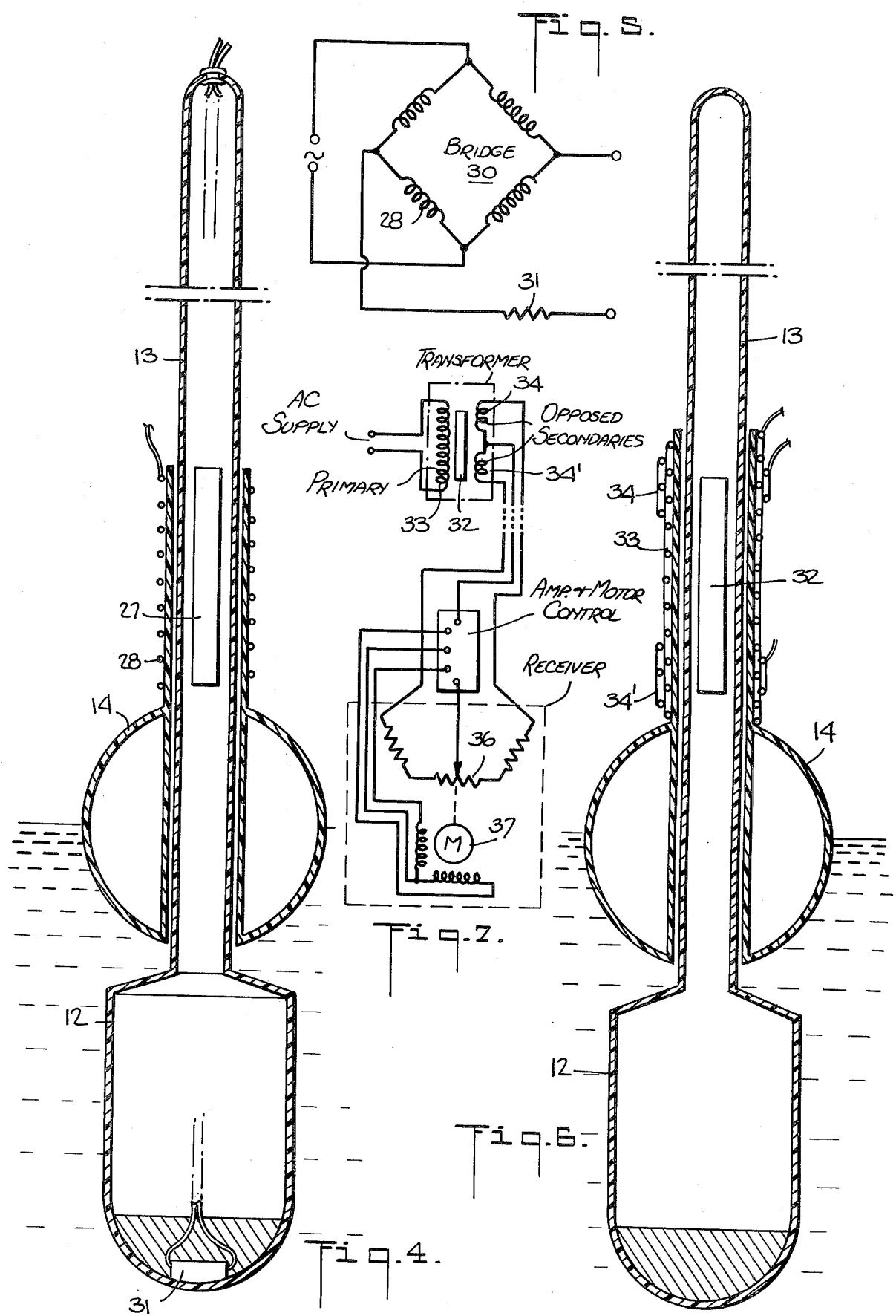

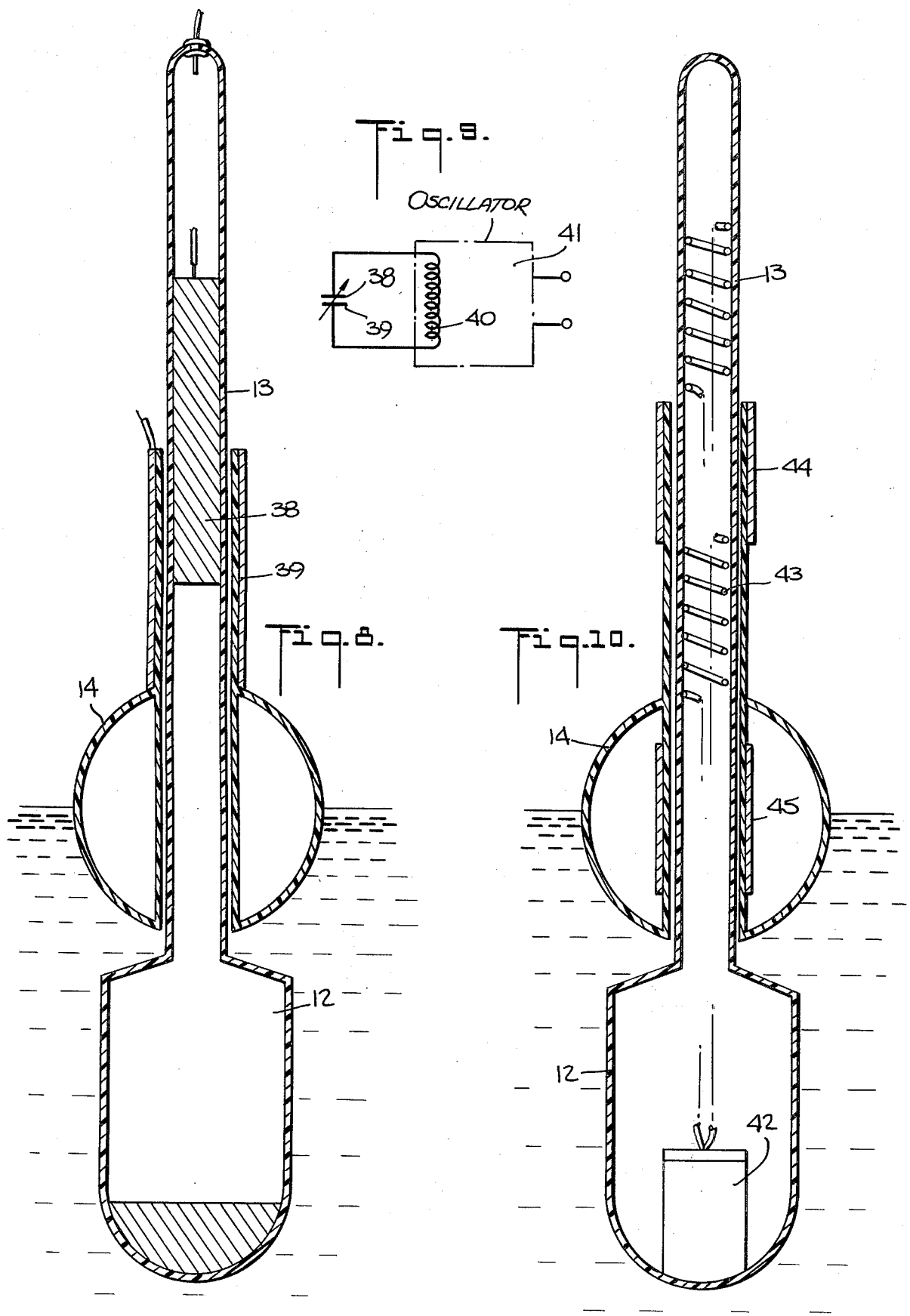

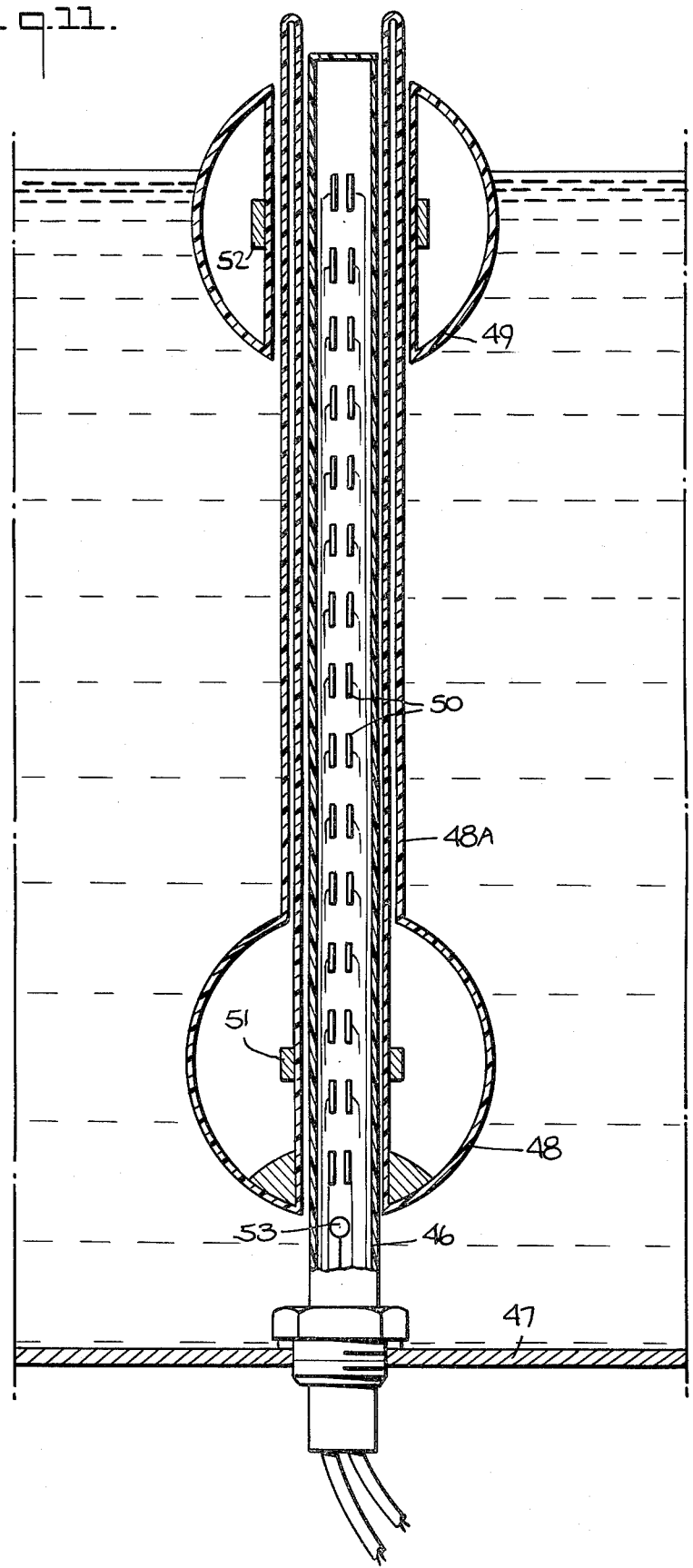

DIFFERENTIAL HYDROMETER ASSEMBLY

BACKGROUND OF THE INVENTION

This invention relates generally to the measurement of specific gravity, and in particular to a differential hydrometer assembly adapted to generate an electrical signal which is a function of the specific gravity of a liquid.

The density of a liquid is defined by its mass per unit volume (i.e. grams per cubic centimeter), whereas the specific gravity (SG) of a liquid is the ratio of its density to that of water. The temperature, pressure and the nature of a liquid all affect its specific gravity.

Industrial specific gravity measurement is usually made to determine the nature of a liquid, such as the concentration of a solution. The effect of temperature and pressure on specific gravity must therefore be taken into account. Since pressure has only a slight effect it can usually be disregarded, but the influence of temperature is more pronounced and must be compensated in order to obtain an accurate reading on the nature of the liquid being tested. For most practical purposes, specific gravity is generally measured at the existing temperature of the liquid to provide a basis for process control.

The standard and ubiquitous hand-hydrometer is the accepted SG measuring device. The conventional hand-hydrometer consists of a weighted float with a graduated stem proportioned so that more or less of the scale is submerged according to the specific gravity of the liquid in which it is floated. Since the hydrometer weight is constant, this is comparable to measuring the volume of liquid equal to a given weight. Hand-hydrometers are widely used where automatic operation is not required.

In automatic process control, it is generally necessary to convert a process parameter, such as temperature, pressure or SG, to corresponding electrical values to be transmitted to a remote station for display, control or recording purposes. The present invention fulfills the need for SG measurement in process control by providing a hydrometer assembly having a displacement transducer that converts the vertical position of the weighted float to a signal which is a function of specific gravity.

One obvious application for a hydrometer assembly in process control lies in the commonly-encountered need to monitor the SG of heated liquids used in chemical processing, such as in electroplating baths. A hand-hydrometer is often useless for this purpose in that vapors from the hot liquid obscure the scale of the hydrometer and make it unreadable. In some instances, as where the solution being monitored becomes explosive or hazardous when its SG exceeds certain limits, it is important to have a continuous SG indication coupled to an alarm so that one is alerted to the approach of a dangerous condition. In this situation, an operator-monitored hydrometer is not satisfactory.

Hydrometer assemblies of the type heretofore known which are capable of producing an output signal as a function of specific gravity have certain drawbacks which render them unsuitable in many situations. Thus a photoelectric hydrometer assembly is known which combines a hydrometer with an electro-optical transducer to sense the displacement of the weighted float. In this instrument, the stem extending from the float is opaque, and as the stem rises and falls as a result of SG changes, it modulates the amount of light passing through a stationary slit and intercepted by a photocell whose output current is then proportional to the specific gravity.

Two factors come into play which may render the photoelectric hydrometer unreliable. Where the liquid being tested emits vapors, these interfere with the amount of light passing through the slit. And where the level of the liquid in the bath being tested is subject to change, as is often the case, this will change the position of the stem relative to the stationary slit. This change, though it does not reflect a change in specific gravity, will nevertheless be translated into a signal change, giving a spurious reading.

Another known SG measuring assembly is the inductance bridge hydrometer. In this instrument, the stem is attached to an armature movable with respect to a stationary coil connected in an inductance bridge which yields a signal as a function of the armature position. Here too a change in liquid level will show up as a misleading change in specific gravity.

SUMMARY OF THE INVENTION

In view of the foregoing, it is the main object of this invention to provide an improved hydrometer assembly which generates a signal that reflects the specific gravity of a liquid in which the hydrometer is immersed without regard to the level of the liquid.

More particularly it is an object of the invention to provide a hydrometer assembly constituted by a hydrometer having a weighted float which is immersed in the liquid being tested and a less buoyant reference float which is partly immersed therein, the hydrometer being associated with a displacement transducer that is responsive to the difference in the vertical float positions to produce a signal which is a function of specific gravity.

Among the significant advantages of the invention are the following:

A. The assembly provides reliable indications of specific gravity in liquid baths whose level is subject to change, the indication being independent of liquid level.

B. The assembly provides a signal which is unaffected by vapors, splashes and other factors that would in the case of a photoelectric hydrometer assembly interfere with the operation of the instrument.

C. The assembly lends itself readily to temperature compensation.

D. The assembly affords a continuous and reliable indication of specific gravity, whereby the resultant signal is useable in conjunction with an automatic process control system to maintain a desired SG value.

Briefly stated, these objects are attained in a differential hydrometer assembly consisting of a differential hydrometer which cooperates with a displacement transducer. The hydrometer is constituted by a weighted float that is fully immersible in the liquid being tested and is provided with an upwardly-extending stem that passes through a vertical opening in a more buoyant reference float that is partly immersed in the liquid, whereby the vertical displacement between the floats varies as a function of specific gravity and is independent of the level of the liquid.

The displacement transducer is constituted by two interacting components one of which is held by the stem and the other by the reference float, the relative movement of the components giving rise to an output signal which depends on specific gravity.

In one embodiment of the invention, one component of the transducer is a permanent magnet which is enclosed in the reference float and acts upon the second component constituted by a series of magnetically-actuated reed switches which are disposed at different heights in the stem to provide signal switching actions indicative of different values of specific gravity, such as predetermined low and high limits and a value intermediate these limits.

In a second embodiment of the invention, one transducer component is a coil supported by the reference float and surrounding the stem, whereas the second component is a magnetic core disposed within the stem, whereby the impedance of the coil is caused to vary as a function of specific gravity. The third embodiment is similar to the second embodiment except that in place of a single coil, there are provided the primary and secondary windings of a differential transformer.

In a fourth embodiment of the invention, the components of the transducer are constituted by the electrodes of a capacitor, one electrode being disposed in the stem and the other being supported by the reference float whereby the resultant reactance value is a function of specific gravity.

In a fifth embodiment of the invention, a ferrite core is supported on the reference float and coacts with a coil disposed within the stem, the coil being included in the resonator of a radio or ultrasonic transmitter disposed within the weighted float, whereby the radiated frequency of the transmitter varies as a function of specific gravity.

In a sixth embodiment of the invention, the weighted float and the more buoyant reference float ride on a vertical stem anchored on the tank, the floats including permanent magnets which selectively actuate a row of reed switches contained in the stem. The switches are connected to sections of a voltage divider to produce an output which varies with the difference in float positions.

In a seventh embodiment of the invention, the arrangement is similar to that of the sixth embodiment, except that each float rides on a separate stem, the two stems being anchored in the same tank or in separate tanks having the same liquid level.

OUTLINE OF DRAWING

For a better understanding of the invention, as well as other objects and features thereof, reference is made to the following detailed description to be read in conjunction with the accompanying drawing wherein:

FIG. 1 is a perspective view of a first preferred embodiment of a differential hydrometer assembly in accordance with the invention;

FIG. 2 is a longitudinal section taken through said first embodiment;

FIG. 3 is the schematic of the electrical circuit associated with said first embodiment;

FIG. 4 is a longitudinal section taken through a second embodiment of the invention;

FIG. 5 is the schematic of the electrical circuit associated with the second embodiment;

FIG. 6 is a longitudinal section taken through a third embodiment of the invention;

FIG. 7 is a schematic of the circuit associated with the third embodiment;

FIG. 8 is a longitudinal section taken through a fourth embodiment of the invention;

FIG. 9 shows in block diagram the circuit associated with the fourth embodiment;

FIG. 10 is a longitudinal section taken through a fifth embodiment of the invention;

FIG. 11 is a section taken through a sixth embodiment of the invention; and

FIRST EMBODIMENT

Figure 12:
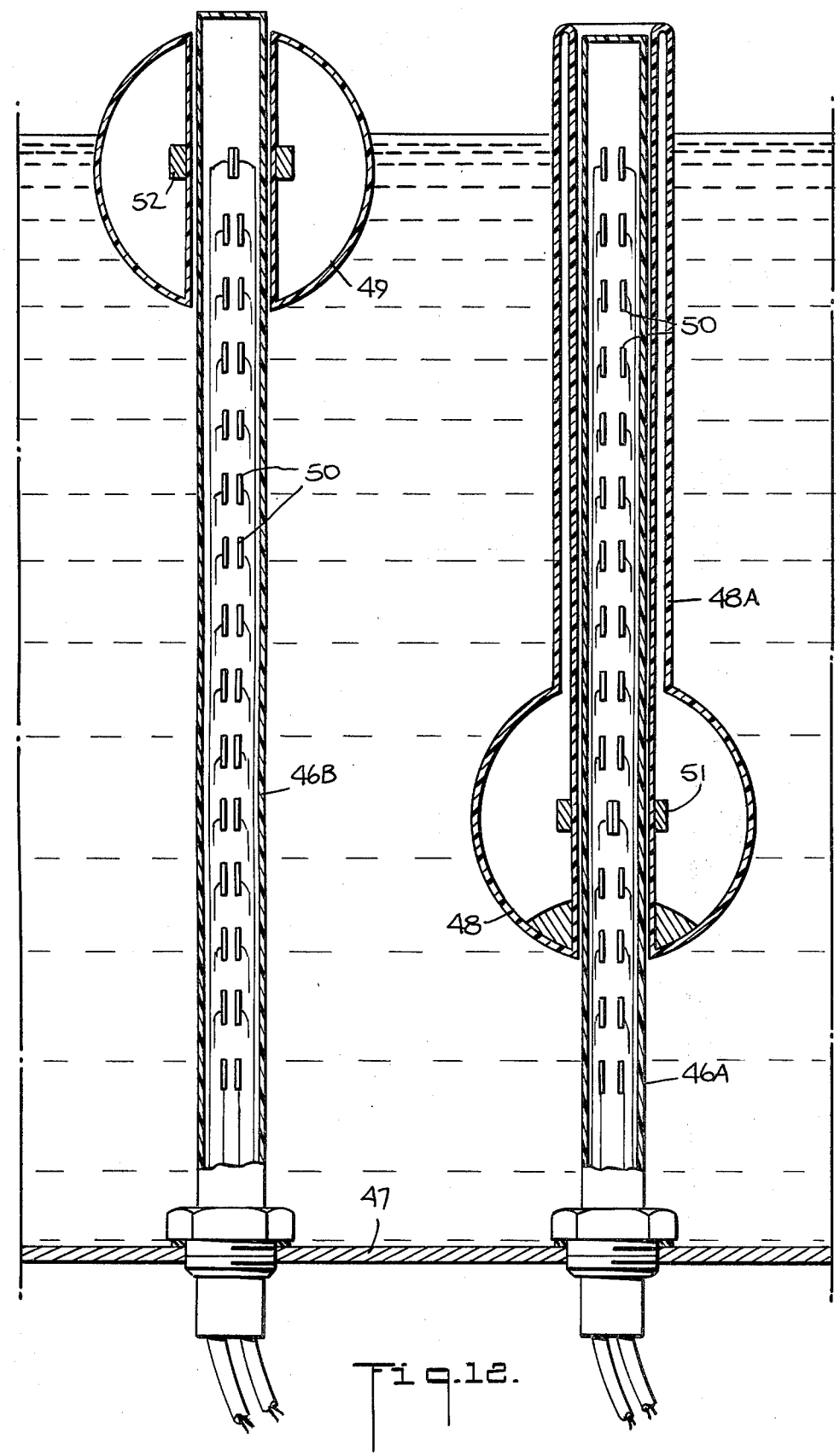
FIG. 12 is a section taken through a seventh embodiment of the invention.

Referring now to FIG. 1, there is shown a first embodiment of a differential hydrometer assembly for generating an electrical signal that depends on the specific gravity of a liquid 10 contained in a tank 11, the level of the liquid bath being subject to change.

The hydrometer is constituted by a weighted float 12 which is fully immersible in the bath and is provided with an upwardly-extending stem 13 that passes through an opening 14A in a more buoyant reference float 14. In order to maintain the position of the hydrometer while permitting the floats freedom of movement in the vertical direction, a bracket 15 is provided having vertically-spaced loop elements 16 and 17 which surround stem 13.

The weighted float 12 may be of the glass type conventionally used in hand hydrometers and includes a weight 12A sufficient to hold the float bulb below the surface of the bath, whereas the reference float has sufficient buoyancy to cause this float to be only partly immersed. Archimedes' principle states that if the weight of a body is the same as an equal volume of water, the body will float in water with its top just at the surface, but if the body, as in the case of the reference float 14, weighs less than an equal volume of water, it will float higher, displacing just enough water to equal its own weight.

If the weight of the body is more than an equal volume of water, it will sink since the net downward force on the water will be greater than the net upward force. For a floating body such as the weighted float 12, the buoyant force also equals the weight of the floating body itself. It is only if a body is denser than the fluid in which it is submerged that buoyancy proves insufficient to support the body, which then sinks to the bottom.

Thus in the differential hydrometer, the reference float always remains somewhat above the surface of the liquid regardless of the level of the bath, whereas most of the volume of the weighted float always remains somewhat below this surface to a degree which varies as a function of the specific gravity of the liquid. The reference float position is also affected by specific gravity, but this factor has a greater effect on the position of the weighted float; hence the relative displacement between the two floats will vary in accordance with specific gravity.

In order therefore to sense this displacement and to generate a signal which varies therewith, a displacement transducer is provided whose structure in the first embodiment includes, as shown in FIG. 2, a ring-shaped permanent magnet 18, the magnet being disposed in the reference float 14 so that it encircles the hollow stem 13 passing through the float opening.

Disposed within stem 13 at distinct levels therein are three magnetically-actuated reed switches 19, 20 and 21 which are connected by a flexible cable 22 to an external circuit of the type shown in FIG. 3. Each switch is normally open and is caused to close only when the switch is positioned in the immediate proximity of ring magnet 18. Hence for a high value of specific gravity, switch 19 will be actuated, for an intermediate value switch 20 will be actuated, and for a low value, switch 21 will be actuated as the vertical position of the weighted float changes relative to that of the reference float.

These switching actions are then translated into a signal whose magnitude represents discrete values of specific gravity represented by the vertical positions of the switches.

To translate the switch actions into a signal, a constant voltage source 23 is provided, as shown in FIG. 3, shunted by a potentiometer 24 having three tap points connected respectively through stem switches 19, 20 and 21 to one output terminal 25. The other output terminal 26 is connected to the low end of the source. Thus when switch 19 is closed, a relatively low voltage is applied across terminals 25-26, when switch 20 is closed a higher voltage is applied and when switch 21 is closed, a still higher voltage is applied. This signal may be fed to a remote station for indication, recording or control purposes.

The first embodiment is of particular value where one needs to indicate the upper and lower safe limits of a process, for when switch 19 is actuated then the specific gravity of the liquid being tested is at a predetermined high value, beyond which is a danger zone. For this purpose an alarm may be provided which is actuated when the high limit is reached. Similarly, switch 21 may be associated with an alarm to indicate that the process has reached a low limit. The transducer arrangement in the first embodiment does not provide a reading of intermediate values between those limits, save for a mid value therebetween. In many practical situations, the SG information afforded by this embodiment is all that is required.

SECOND EMBODIMENT

In the second embodiment illustrated in FIG. 4, the displacement transducer is constituted by an armature 27 which is movable relative to a coil 28. The armature is in the form of a ferromagnetic core such as one of ferrite material, the armature being disposed within stem 13. Coil 28 is wound on a tubular coil form supported on reference float 14 and surrounding stem 13. By including coil 28 as one arm of an A-C inductance bridge 30, as shown in FIG. 5 and by arranging the bridge so that a null is produced for a predetermined value of specific gravity, an output signal is yielded which depends on the extent and direction of the deviation of specific gravity from the predetermined value.

In order to compensate this assembly for SG changes arising from variations in temperature, a thermistor 31 is mounted in the weighted float 12, the resistance thereof varying as a function of the temperature of the liquid being tested. The thermistor is included in the bridge circuit to alter the output signal in a direction and to an extent compensating for temperature variations. In practice, the temperature-sensing element need not be incorporated within the hydrometer, and may be placed directly in the bath.

The change of inductance produced by the transducer shown in FIG. 4 may be exploited in other ways to produce a signal reflecting specific gravity. For example, the sensing inductor 28 may be included in the frequency-determining circuit of a low-frequency oscillator to produce an output signal whose frequency changes in accordance with changes in specific gravity.

It is to be noted that the relationship between the output signal and specific gravity is not linear, and it is necessary therefore in indicating the signal in terms of specific gravity to have a non-linear scale. Alternatively, in those situations as in process control, where it is desirable to have a linear relationship between the output voltage and specific gravity, suitable signal conditioners may be used, such as an operational amplifier, adapted to treat the non-linear signal so as to yield a linear signal.

THIRD EMBODIMENT

Referring now to FIG. 6, there is shown a third embodiment of a differential hydrometer assembly in which the displacement transducer is in the form of a differential transformer having a movable ferromagnetic core 32 (i.e. iron), a primary coil 33, and two secondary coils 34 and 34'.

The core is disposed within stem 13, whereas the coils are mounted on forms supported on reference float 14. Thus all of the transformer coils are disposed along a common axis and have a common magnetic circuit, the movable iron core being displaceable in the vertical direction in accordance with specific gravity. In practice the secondary coils may be connected additively or differentially and may be included in the circuit of a null type instrument balanced either by shifting the core of a similar transformer excited from the same source or by the use of a slide wire potentiometer.

Thus as shown in FIG. 7, the differential transformer is coupled with a servo-actuated receiver at a remote station through a suitable amplifier 35 whose output is applied to the slider of a potentiometer 36 which is operated by servo motor 37. This servo arrangement may be used to operate a valve or other control element maintaining the desired value of specific gravity in the process being sensed and controlled.

FOURTH EMBODIMENT

Referring now to FIG. 8, there is shown a fourth embodiment of the hydrometer assembly which in this instance makes use of a capacitative transducer to translate specific gravity into an electrical signal. The transducer is constituted by a capacitor having a tubular electrode 38 mounted on reference float 14 and surrounding stem 13 which incorporates a rod-shaped electrode 39.

The extent to which electrode 39 is telescoped within electrode 38 depends on specific gravity, thereby producing a change in reactance which may be translated into a signal change. Thus as shown in FIG. 9, the capacitor may be included in the frequency-determining circuit 40 of an oscillator 41 whose output signal represents specific gravity.

FIFTH EMBODIMENT

In the embodiments previously disclosed, the transducer in each instance is wired to the remote indicating, recording or control station, and it is necessary therefore to extend wires from the hydrometer to the station. In the fifth embodiment shown in FIG. 10, the signal transmission from the displacement transducer is wireless, and for this purpose there is incorporated in the weighted float 12 a miniature transmitter 42 whose radiated output frequency (or any other parameter) is varied as a function of specific gravity.

For this purpose, a coil 43 is buried within stem 13, the coil cooperating with sleeve-like ferrite elements 44 and 45 supported by reference float 14, whereby the inductance value of the coil varies as the stem is displaced relative to this float. The coil is included in the transmitter circuit and its varying inductance serves to modulate the parameter being controlled.

SIXTH EMBODIMENT

In this embodiment shown in FIG. 11 the vertical guide post 46 is a hollow tube which is anchored on the bottom of the process vessel 47 containing the liquid whose specific gravity is to be measured. Riding on the post are two floats 48 and 49, one above the other. Float 48 contains a weight and acts therefore as the submerged weighted float, while float 49 is more buoyant and serves as the reference float. Float 48 is provided with a stem 48A which is concentric with guide post 48 and extends through the hollow core of float 49.

A vertical row of magnetically-actuatable reed switches 50 are enclosed within post 46, the switches cooperating with permanent magnet rings 51 and 52, respectively, in floats 48 and 49. The position of each float on the post determines which of the associated switches is actuated. By connecting the several switches to respective sections of a potentiometer or voltage divider, the resultant voltage becomes a function of the difference in the vertical position of the two floats.

In practice the two floats may be in the form of stainless steel hollow shells each containing a ring magnet, one shell being weighted and the other not. A temperature sensor 53 may be incorporated in the post to compensate for the effect of temperature in the voltage output.

SEVENTH EMBODIMENT

The seventh embodiment as shown in FIG. 12 is essentially the same in principle as the sixth except that the buoyant float and the reference float are freely supported and ride on separate posts each provided with a row of reed switches. Thus the weighted float 48 rides on post 46A anchored on the bottom of the tank and the buoyant float 49 rides on post 46B also anchored on the bottom of the tank. Float 48 is provided with a stem 48A concentric with post 46A.

The two guide posts 46A and 46B may be placed adjacent each other in the same tank, or they could be mounted in separate tanks as long as the liquid level in both tanks is the same, this being accomplished by interconnecting plumbing. It is not essential in the various embodiments of the invention that the reference float be only partly immersed as long as it is more buoyant than the weighted float so that a difference in buoyancy exists from which one can derive a reliable reading of specific gravity regardless of liquid level. It will be recognized that the arrangement in FIGS. 11 and 12 may include any of the other position sensing methods disclosed herein and is not limited to reed switches.

MODIFICATIONS

In the foregoing embodiments, the stem is displaced relative to a reference float whose position on the surface of the bath changes with changes in the level of the bath. In some instances, where the bath level is substantially constant, one may use a non-floating fixed reference for the transducer. Thus is the embodiment of FIG. 2, instead of placing the permanent magnet in the reference float, it may be mounted at a fixed position relative to the tank wall so that as the stem moves vertically with changes of specific gravity, the switches 19, 20 and 21 are selectively actuated.

In all of the foregoing embodiments, liquid level has been sensed by a float assembly, however other liquid level sensing methods could be used in cooperation with the weighted float to provide the differential positioning system essential to the invention. For instance, liquid level could be sensed by means of a liquid pressure sensor or any independent ultrasonic sensor, or a series of temperature sensing elements, any of which methods would replace the buoyant reference float. Suitable electrical circuitry would integrate the signals from these sensors with signals establishing the vertical position of the weighted float and would enable the differential between weighted float and liquid level to be determined.

Non-Differential Embodiments:

Many of the components of the present invention are novel in themselves without being considered as part of a differential electro-hydrometer system. For example, stem 46A in conjunction with float 48 in FIG. 12 taken alone provides an electro-hydrometer suitable for use with a fixed liquid level bath. The physical configuration illustrated in FIG. 12 could alternatively use the electrical sensing methods shown in other figures in a non-differential electro-hydrometer. The inventions disclosed herein fall into two main categories relying on the use of a weighted float associated with a transducer to sense its vertical position in the fluid volume. The first category is divided into two sub-categories:

1a. A specific gravity sensing device which makes use of an electrical, magnetic, photo-electric, electro-magnetic or ultrasonic transducer sensing system associated with two floats of different buoyancy in such a way that the difference in their relative vertical positions in a fluid body is sensed and used as a variable to determine changes in specific gravity of that fluid. The floats may be concentrically mounted or separately mounted, as desired.

1b. A specific gravity sensing system as described in 1a above except that a different independent liquid level sensing device is used instead of a float as the cooperating component which in conjunction with a weighted float assembly and suitable transducer elements form the basis of a differential instrument for measuring specific gravity.

The second category covers:

a. A non-differential electro-hydrometer for use in fluid baths of fixed liquid level, represented by such embodiments as are illustrated in the figures if the electrical elements shown as supported by buoyant floats were instead fixed relative to the bath assembly.

The Differential Hydrometer Assembly in accordance with the invention, regardless of its form, is based on the principle that when two bodies of dissimilar mean densities are freely suspended in a liquid of greater density, they will assume positions such that the distance between them in the vertical plane will vary as a function of changes in liquid density. A transducer responsive to the changing vertical distance between these bodies may be used to produce a signal which is a function of liquid density.

While there have been shown several forms or embodiments of the invention, it will be appreciated that many changes and modifications may be made therein without departing from the essential spirit of the invention.

I claim:

1. A differential hydrometer assembly adapted to generate an electrical signal whose value is a function of the specific gravity of liquid within a tank, the level of the liquid being subject to change, said assembly comprising:
   A. a guide stem anchored in the bottom of said tank and extending upwardly therefrom to a height above the highest level of said liquid;
   B. a weighted float fully immersible in said liquid, said float having an opening therein through which said stem extends to permit said float to ride freely on said stem;
   C. a first transducer having an element disposed within said stem and a cooperating element disposed within said weighted float to produce a first output that depends on the relative position of said elements and is a function of the specific gravity;
   D. a reference float in said liquid having a greater buoyancy than said weighted float, whereby said reference float always remains somewhat above the surface of said liquid regardless of its level in the tank, and
   E. a second transducer coupled to said reference float to produce a second output which depends on the liquid level, said first output being combined with said second output to provide a specific gravity indication independent of liquid level.

2. An assembly as set forth in claim 1, further including a second guide stem anchored on the bottom of said tank, said reference float riding freely on said second stem, said second transducer having an element disposed within said second stem and a cooperating element disposed within said reference float.

3. An assembly as set forth in claim 1, wherein said reference float also rides freely on said stem and said second transducer has an element disposed within said reference float and a cooperating element disposed within said stem.

4. An assembly as set forth in claim 1, wherein said element disposed within said weighted float is a permanent magnet and said cooperating element is a series of magnetically-actuated switches disposed within said stem at different heights therein.

5. An assembly as set forth in claim 1, further including a temperature sensor disposed within said guide stem to provide a signal that depends on the temperature of the liquid to compensate for the effect of temperature on said transducer output.

* * * * *